3,030,425
ALKALINE STABILIZATION OF POLYOXY- ALKYLENE GLYCOLS

Edward J. Mills, Jr., and William J. Tapp, Charleston, W. Va., assignors to Union Carbide Corporation, a corporation of New York
No Drawing. Filed May 20, 1958, Ser. No. 736,466
5 Claims. (Cl. 260—611.5)

This invention relates to polyoxyalkylene compositions and to a method for stabilizing polyoxyalkylene compounds against oxidation. More specifically, the present invention relates to polyoxyalkylene compounds having incorporated therein a small quantity of an alkaline reacting salt of an alkali metal.

Polyoxyalkylene compounds, such as polyethylene glycols and polypropylene glycols are commercially produced batchwise by charging a hydroxyl containing compound such as water, ethylene glycol, diethylene glycol, dipropylene glycol, tripropylene glycol and similar di- and polyhydric alcohols into a reaction tank. An alkaline catalyst is then added to one of the above hydroxyl containing compounds. The concentration of the alkaline catalyst usually varies from about 1% to 5% based on the weight of the hydroxyl containing compound. A few such catalysts are: sodium hydroxide, potassium hydroxide, cesium hydroxide, rubidium hydroxide or corresponding alcoholates and glycolates. It is preferable to purge the reactors with an inert atmosphere of nitrogen, free of carbon dioxide, prior to charging. The contents of the reactor are then vigorously agitated and heated to approximately 120° C. When the contents of the reactor reach the temperature of about 120° C. ethylene oxide, propylene oxide or mixtures thereof under pressure (up to about 50–75 p.s.i.g.) is introduced at such a rate that the exothermic reaction (controlled by external wall cooling of reactor) is maintained in the range of 120° C. to 150° C. After the oxide has been added the agitation of the reaction mass is continued until essentially all the oxide has reacted. The pH of the reaction mass at this point is at least about 8.5. The pH is measured using a 5 weight percent solution or dispersion of the polyoxyalkylene glycol in water. The catalyst is neutralized by the addition of an equivalent molar quantity of an acid such as HCl, $H_2SO_4$, $H_3PO_4$, or an acid form of an ion exchange resin. The neutralized product is then carefully filtered using a conventional leaf-type filter press and with one of the common filter aids, e.g. diatomaceous earth. The neutralized and filtered product is essentially free of the insoluble neutralization products (ash-forming salts), particles such as pieces of packing material, rust particles and any other items of "debris" that might have been present in the reactor system.

The neutralized and filtered polyoxyalkylene glycols show a marked degree of oxidative degradation upon storage at room temperatures. This degradation is accompanied by the formation of odoriferous formic and acetic acids and either glyoxal or glycollic aldehyde. This degradation is also accompanied by a continuous decrease in both the melt viscosity of the polyoxyalkylene glycol and its pH. The formation of the various organic degradation compounds in the polyoxyalkylene glycol and the decrease in viscosity are detrimental to the use of the glycols for applications such as salves, suppositories, cosmetics and lubricants.

During the formation of the polyoxyalkylene glycols it is believed that some of the oxide (e.g. ethylene oxide) isomerizes to acetaldehyde which in turn reacts with the polyalkylene glycols to form polyalkylene glycol acetals. The extent of such acetal formation occurs only to a very slight extent in terms of percent acetaldehyde based upon the total weight of reaction mass. However, only a small concentration of acetaldehyde with a molecular weight of 44 can react with a large weight of polyoxyalkylene glycol whose molecular weight is for example 3000 i.e. 44 grams acetaldhyde reacts with 6000 grams of a polyoxyalkylene glycol having a molecular weight of 3000. Hydrolysis of such an acetal, as illustrated in step 1 which follows, can occur in the presence of small amounts of water relative to the weight of polyoxyalkylene glycol. To illustrate 18 grams (1 mole of water could hydrolyze an acetal formed from 6000 grams of polyoxyalklene glycol (molecular weight 3000) and 44 grams of acetaldehyde. The reaction mechanism of this degradation is believed to follow the following steps:

(1) Polyglycol acetal + $H_2O$ (as traces of moisture)→ polyglycol + acetaldehyde
(2) Acetaldehyde + $O_2$ (atmospheric)→peracetic acid
(3) Peracetic acid + polyglycol→acetaldehyde + acetic acid + formic acid + glycollic aldehyde + degraded polyglycol
(4) Aldehydes from step 3 function in steps 2 and 3

Thus the degradation is autocatalytic and prevention of step 1 can and does produce a stable polyalkylene glycol. Thus even the presence of a relatively small concentration of the polyoxyalkylene glycol acetal in the total reaction mass can effect, ultimately, extensive degradation.

It has now been discovered that the oxidative degradation of polyoxyalkylene glycols can be prevented by the addition of small amounts of certain inorganic alkaline materials. The alkaline materials are added to the glycols after neutralization and filtration of the reaction mass. The concentration of the alkaline material should be from about 0.001% to about 0.1% by weight of the polyoxyalkaline glycol. Concentrations of the alkaline material above about 0.1% to 0.2% which corresponds to a pH, of a 5% solution of the glycol in water, above about 7 is undesirable particularly in topical applications. Furthermore concentrations greater than about 0.1% to 0.2% give glycols an unattractive murky appearance.

The alkaline stabilizers contemplated by the inventors are alkaline reacting salts of the alkali metals. A few such salts are: disodium hydrogen phosphate, sodium carbonate, dipotassium hydrogen phosphate, trisodium phosphate, tripotassium phosphate, potassium carbonate, lithium acetate, lithium carbonate, trilithium phosphate, dilithium hydrogen phosphate, sodium acetate and potassium acetate.

To provide an understanding of the invention, it will be described by illustrations of the performance of polyethylene glycol, but it is understood that the method of the invention is equally applicable to other polyoxyalkylene compounds. The invention is applicable to either liquid or solid polyoxyalkylene compounds.

EXAMPLE 1

One gram of disodium hydrogen phosphate was added to one thousand grams of liquefied polyethylene glycol and thoroughly dispersed therein as the melt solidified. Samples of the polyethylene glycol containing the phosphate salt and a sample of untreated polyethylene glycol were examined at intervals throughout a five month period. Samples 1A and 1B in Table I were taken from the same batch of polyethylene glycol. As indicated in Table I, the untreated material designated as Sample 1A exhibited a marked indication of degradation as indicated by a decrease in its melt viscosity during storage at ambient temperatures in closed containers containing air. On the other hand the polyethylene glycol sample containing a phosphate additive (Sample 1B) showed a marked stability as indicated by a relatively small decrease in its viscosity over the same period of storage.

EXAMPLE 2

Samples of two polyethylene glycols were manufactured by conventional methods and divided into two portions. Samples 2A and 2B were both prepared from the same batch of polyethylene glycol. Samples 3A and 3B were prepared from a different batch of polyethylene glycol. Samples 2A and 3A are unstabilized polyglycol samples, while samples 2B and 3B are stabilized in accordance with the method of the invention. As shown in Table I, a comparison is made between samples 2A and 2B, and 3A and 3B. One of each (Samples 2A and 3A) was filtered to remove all contained salts. The remaining portions of each of these two production runs were filtered through filter presses which had been precoated with sodium carbonate. Some sodium carbonate about 0.1% was allowed to pass through with the molten filter products. Samples 2B and 3B represent material so produced. The four samples were finished in the form of flaked products and stored at ambient temperatures in closed containers containing air. As indicated in Table I, the uninhibited samples showed marked deterioration. The samples containing sodium carbonate (Samples 2B and 3B) were stable.

The methods used to introduce the basic inhibitors as described above are not limiting. It is necessary only to get uniform distribution of the alkaline inhibitor throughout the polyethylene glycols and any method which will accomplish this is suitable. Addition of the basic compound can be made at any temperature above the melting point of the polyoxyalkylene glycol. This temperature varies generally from about 37° C. to about 63° C.

The method of the invention requires no special equipment. It is convenient to use for the mixing process, an apparatus equipped with a device adequate for stirring the fluid mixture. Where solid salt inhibitors are employed, the mixer should be capable of stirring the polyglycol.

This application is a continuation-in-part of applicants' copending application Serial No. 538,260, filed on October 3, 1955, and now abandoned.

What is claimed is:

1. In a process for the production of polyethylene glycol having a melting point of at least about 37° C. wherein an alkaline catalyst is employed and wherein upon the formation of said polyethylene glycol said alkaline catalyst is neutralized and the crude reaction product thereby formed is subsequently filtered, the improvement of adding to and dispersing in the filtered polyethylene glycol product, at a temperature above the melting point of said polyethylene glycol, from about 0.001 percent to about 0.2 percent by weight based upon said polyethylene glycol of a stabilizer selected from the group consisting of disodium hydrogen phosphate, dilithium hydrogen phosphate, dipotassium hydrogen phosphate, trisodium phosphate, trilithium phosphate, tripotassium phosphate, sodium carbonate, lithium carbonate, potassium carbonate, sodium acetate, lithium acetate and potassium acetate, the amount of said stabilizer being commensurate with a pH of up to about 7 in the resulting product, thereby stabilizing said polyethylene glycol to oxidative degradation.

2. The improvement according to claim 1 wherein said stabilizer is sodium carbonate.

3. The improvement according to claim 1 wherein said stabilizer is potassium carbonate.

4. The improvement according to claim 1 wherein said stabilizer is disodium hydrogen phosphate.

5. The improvement according to claim 1 wherein said stabilizer is dipotassium hydrogen phosphate.

References Cited in the file of this patent

UNITED STATES PATENTS

| | | |
|---|---|---|
| 2,450,079 | Brown | Sept. 28, 1948 |
| 2,711,401 | Lally | June 21, 1955 |
| 2,721,183 | White et al. | Oct. 18, 1955 |
| 2,733,272 | Horsley et al. | Jan. 31, 1956 |

*Table I*

STABILITY OF FLAKED SOLID POLYETHYLENE GLYCOLS DURING STORAGE IN CLOSED CONTAINERS AT AMBIENT TEMPERATURES

| Sample No. | 1A | | 1B | | 2A | |
|---|---|---|---|---|---|---|
| Additive | None | | Disodium Hydrogen Phosphate | | None | |
| Storage Time, Months | Viscosity, Centistokes at 210° F. | pH of a 5% Solution of Polyethylene Glycol in Water | Viscosity, Centistokes at 210° F. | pH of a 5% Solution of Polyethylene Glycol in Water | Viscosity, Centistokes at 210° F. | pH of a 5% Solution of Polyethylene Glycol in Water |
| 0 | 865 | 5.5 | 822 | | 922 | |
| 1 | 868 | 4.2 | | | 889 | 4.5 |
| 2 | 776 | 4.0 | 789 | 4.1 | 872 | 4.4 |
| 3 | 790 | 3.8 | 810 | 3.9 | 864 | 3.9 |
| 4 | 752 | 3.6 | 786 | 4.3 | 834 | 4.0 |
| 5 | 686 | 3.7 | 778 | 3.9 | 798 | 3.8 |
| 8 | | | | | 422 | |
| 12 | | | | | 206 | |

| Sample No. | 2B | | 3A | | 3B | |
|---|---|---|---|---|---|---|
| Additive | Sodium Carbonate | | None | | Sodium Carbonate | |
| Storage Time, Months | Viscosity, Centistokes at 210° F. | pH of a 5% Solution of Polyethylene Glycol in Water | Viscosity, Centistokes at 210° F. | pH of a 5% Solution of Polyethylene Glycol in Water | Viscosity, Centistokes at 210° F. | pH of a 5% Solution of Polyethylene Glycol in Water |
| 0 | 910 | | 847 | 5.2 | | 5.2 |
| 1 | 922 | 6.4 | 863 | 4.7 | | 4.9 |
| 2 | 905 | 6.7 | 792 | 4.0 | 830 | 5.1 |
| 3 | 920 | 6.4 | 738 | 3.7 | 816 | 4.8 |
| 4 | 909 | 6.6 | 660 | 3.5 | 812 | 5.0 |
| 5 | 904 | 6.6 | 558 | 3.4 | 820 | 5.0 |
| 8 | 885 | | 283 | | 814 | |
| 12 | 847 | | 180 | | 828 | |